(12) United States Patent
Chang

(10) Patent No.: US 9,870,089 B2
(45) Date of Patent: Jan. 16, 2018

(54) IN-CELL TOUCH SCREEN HAVING A DRIVER FOR CONCURRENTLY SCANNING A PLURALITY OF ELECTRODE LINES AND A METHOD OF DRIVING THE SAME

(71) Applicant: HIMAX TECHNOLOGIES LIMITED, Tainan (TW)

(72) Inventor: Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 47 days.

(21) Appl. No.: 14/812,748

(22) Filed: Jul. 29, 2015

(65) Prior Publication Data

US 2016/0349919 A1 Dec. 1, 2016

Related U.S. Application Data

(60) Provisional application No. 62/169,411, filed on Jun. 1, 2015.

(51) Int. Cl.
*G06F 3/041* (2006.01)
(52) U.S. Cl.
CPC .................. *G06F 3/0416* (2013.01)
(58) Field of Classification Search
CPC ............................. G06F 3/0418; G06F 3/044
USPC ........................................................ 345/173
See application file for complete search history.

(56) References Cited

U.S. PATENT DOCUMENTS

| | | | | |
|---|---|---|---|---|
| 5,581,274 A * | 12/1996 | Tagawa | ................. | G06F 3/0412 |
| | | | | 178/20.01 |
| 2012/0044166 A1* | 2/2012 | Mizuhashi | ............ | G06F 3/0412 |
| | | | | 345/173 |
| 2012/0050217 A1* | 3/2012 | Noguchi | ............... | G06F 3/0412 |
| | | | | 345/174 |
| 2014/0009412 A1* | 1/2014 | Ahn | ...................... | G06F 3/0304 |
| | | | | 345/173 |
| 2014/0253481 A1* | 9/2014 | Kim | ...................... | G06F 3/0416 |
| | | | | 345/173 |
| 2015/0077370 A1* | 3/2015 | Kim | ...................... | G06F 3/0416 |
| | | | | 345/173 |

FOREIGN PATENT DOCUMENTS

| | | |
|---|---|---|
| JP | 04308913 A | 10/1992 |
| JP | 2013231932 A | 11/2013 |
| KR | 1020150032409 A | 3/2015 |
| KR | 1020150041265 A | 4/2015 |

OTHER PUBLICATIONS

Office Action issued by the Japan Patent Office dated Jul. 5, 2016 for JP,2015-174665, Japan.
Office Action issued by the Republic of Korea (KIPO) dated Jul. 11, 2016 for KR 10-2015-0128136, Korea.

* cited by examiner

*Primary Examiner* — Long D Pham
(74) *Attorney, Agent, or Firm* — Tim Tingkang Xia, Esq.; Locke Lord LLP

(57) ABSTRACT

The present invention is directed to a method of driving an in-cell touch screen. A common voltage (VCOM) layer of the in-cell touch screen is divided into transmit (TX) electrodes and receive (RX) electrodes, the TX electrodes forming TX electrode lines in a first direction and the RX electrodes forming RX electrode lines in a second direction. The TX electrode lines are arranged into a plurality of groups. The groups of TX electrode lines are concurrently scanned in touch sensing mode.

10 Claims, 6 Drawing Sheets

IN-CELL TOUCH SCREEN HAVING A DRIVER FOR CONCURRENTLY SCANNING A PLURALITY OF ELECTRODE LINES AND A METHOD OF DRIVING THE SAME

CROSS-REFERENCE TO RELATED APPLICATIONS

This application claims the benefit of U.S. Provisional Application No. 62/169,411, filed on Jun. 1, 2015, the entire contents of which are hereby incorporated by reference.

BACKGROUND OF THE INVENTION

1. Field of the Invention

The present invention generally relates to an in-cell touch screen, and more particularly to an in-cell touch screen with reduced scan time.

2. Description of Related Art

A touch screen is an input/output device that combines touch technology and display technology to enable users to directly interact with what is displayed. A capacitor-based touch panel is a commonly used touch panel that utilizes capacitive coupling effect to detect touch position. Specifically, capacitance corresponding to the touch position changes and is thus detected, when a finger touches a surface of the touch panel.

In order to produce thinner touch screens, in-cell technology has been adopted that eliminates one or more layers by building capacitors inside the display. An in-cell touch screen sharing a common voltage layer should perform display and touch sensing in turn. As display resolution of the in-cell touch screen increases, more time need be allocated for performing display, and less time is left for performing touch sensing, thereby affecting signal-to-noise ratio (SNR) of touch sensing and reducing touch accuracy.

A need has thus arisen to propose a novel in-cell touch screen and an associated method of driving the in-cell touch screen to overcome the drawbacks of the conventional in-cell touch screen.

SUMMARY OF THE INVENTION

In view of the foregoing, it is an object of the embodiment of the present invention to provide a method of driving an in-cell touch screen that is capable of substantially reducing scan time in touch sensing mode, and/or substantially enhancing touch accuracy.

According to one embodiment, a common voltage (VCOM) layer of an in-cell touch screen is divided into transmit (TX) electrodes and receive (RX) electrodes, the TX electrodes forming TX electrode lines in a first direction and the RX electrodes forming RX electrode lines in a second direction. The TX electrode lines are arranged into a plurality of groups. The plurality of groups of TX electrode lines are concurrently scanned in touch sensing mode.

DETAILED DESCRIPTION OF THE INVENTION

Figure 1:
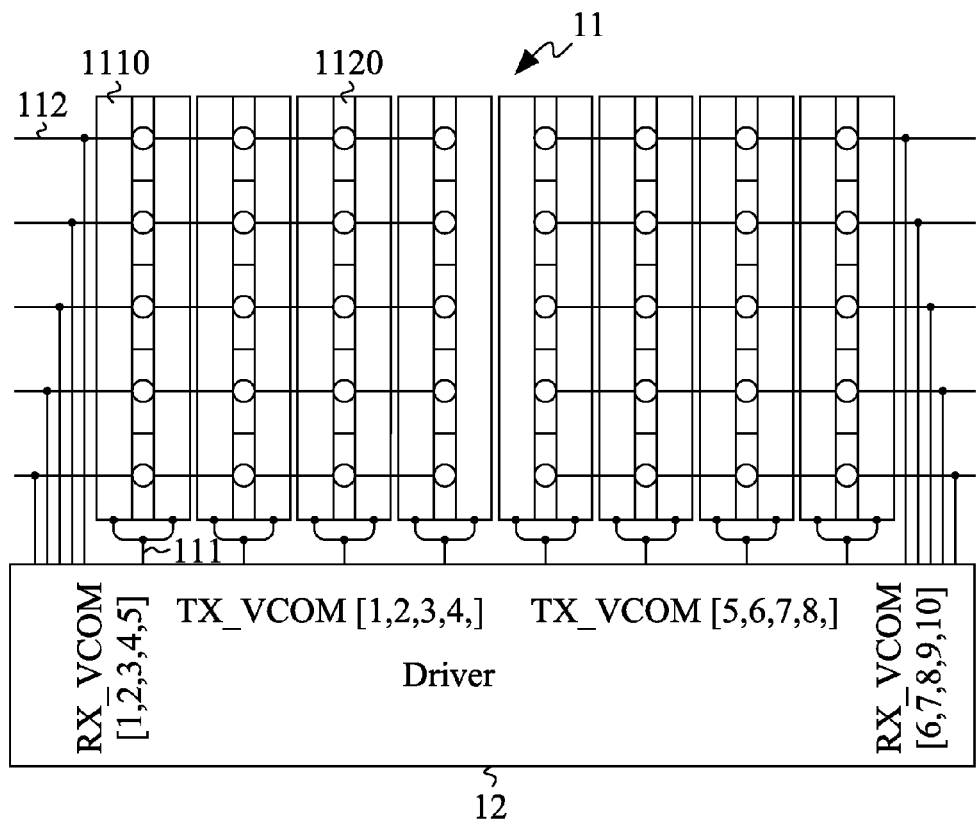
FIG. 1 schematically shows a top view of an in-cell touch screen according to one embodiment of the present invention.

FIG. 1 schematically shows a top view of an in-cell touch screen 100 according to one embodiment of the present invention. In the embodiment, the in-cell touch screen 100 includes a common voltage (VCOM) layer 11 that is divided into VCOM electrodes grouped into transmit (TX) electrodes 1110 and receive (RX) electrodes 1120. The shape and configuration of the TX electrode 1110 and the RX electrodes 1120 shown in FIG. 1 are for illustration purposes, and are not intended to limit the present invention.

TX electrodes 1110 form TX electrode lines 111 longitudinally or in a first direction. For example, TX_VCOM[1] to TX_VCOM[8] are formed as exemplified in FIG. 1. RX electrodes 1120 form RX electrode lines 112 latitudinally or in a second direction. For example, RX_VCOM[1] to RX_VCOM[10] are formed as exemplified in FIG. 1. The first direction may, but not necessarily, be substantially perpendicular to the second direction.

The in-cell touch screen 100 also includes a driver 12 that electrically couples with the TX electrode lines 111 and RX electrode lines 112. In touch sensing mode, the driver 12 transmits TX signals to the TX electrode lines 111 and receives RX signals from the RX electrode lines 112 in order to determine a touch point or points. In display mode, the TX electrodes 1110 and the RX electrodes 1120 are electrically connected to a common voltage.

Figure 2:
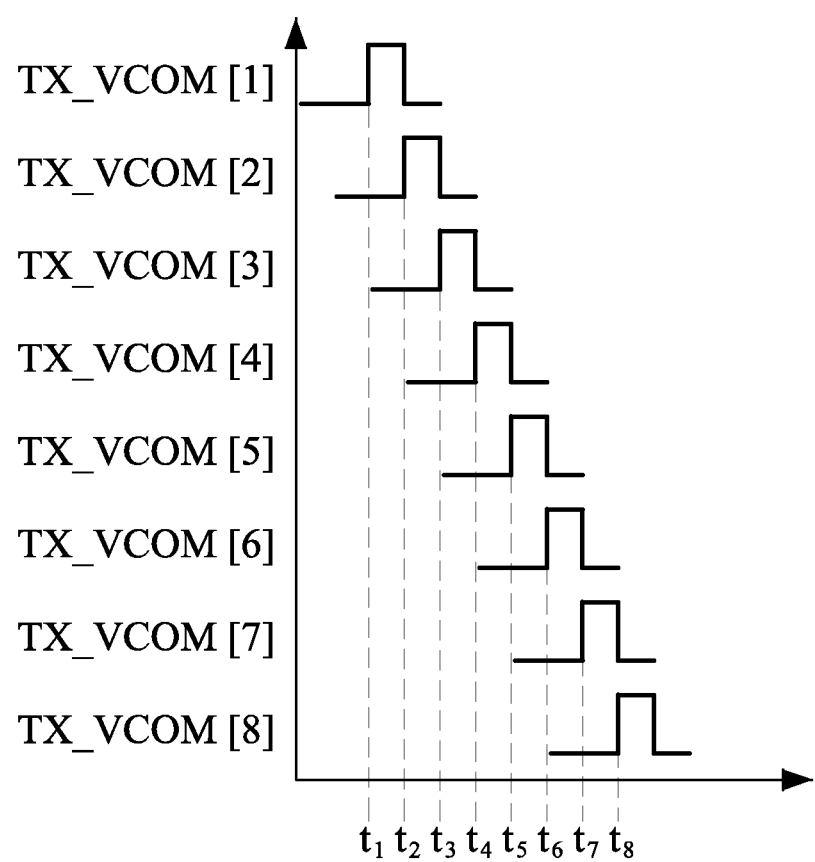
FIG. 2 shows a timing diagram illustrated of scanning TX electrode lines of FIG. 1.

FIG. 2 shows a timing diagram illustrated of scanning (i.e., transmitting TX signals to) TX electrode lines TX_VCOM[1] to TX_VCOM[8] by the driver 12. It is observed that, as the TX electrode lines 111 are scanned in turn, eight scan periods are required to complete the scan.

According to one aspect of the embodiment, the TX electrode lines 111 are arranged into plural (two in this embodiment) groups. For example, the first four TX electrode lines 111 TX_VCOM[1,2,3,4] constitute a first group of TX electrode lines 111, and the next four TX electrode lines 111 TX_VCOM[5,6,7,8] constitute a second group of TX electrode lines 111.

Referring back to FIG. 1, the RX electrode lines 112 are also arranged into plural (two in this embodiment) groups. In the embodiment, a number of the groups of TX electrode lines 111 is the same as a number of the groups of RX electrode lines 112. For example, the first five RX electrode lines 112 RX_VCOM[1,2,3,4,5] constitute a first group of RX electrode lines 112 that are associated with the first group of TX electrode lines 111 for determining touch point(s). The next five RX electrode lines 112 RX_VCOM[6,7,8,9,10] constitute a second group of RX electrode lines 112 that are associated with the second group of TX electrode lines 111 for determining touch point(s).

Figure 3:
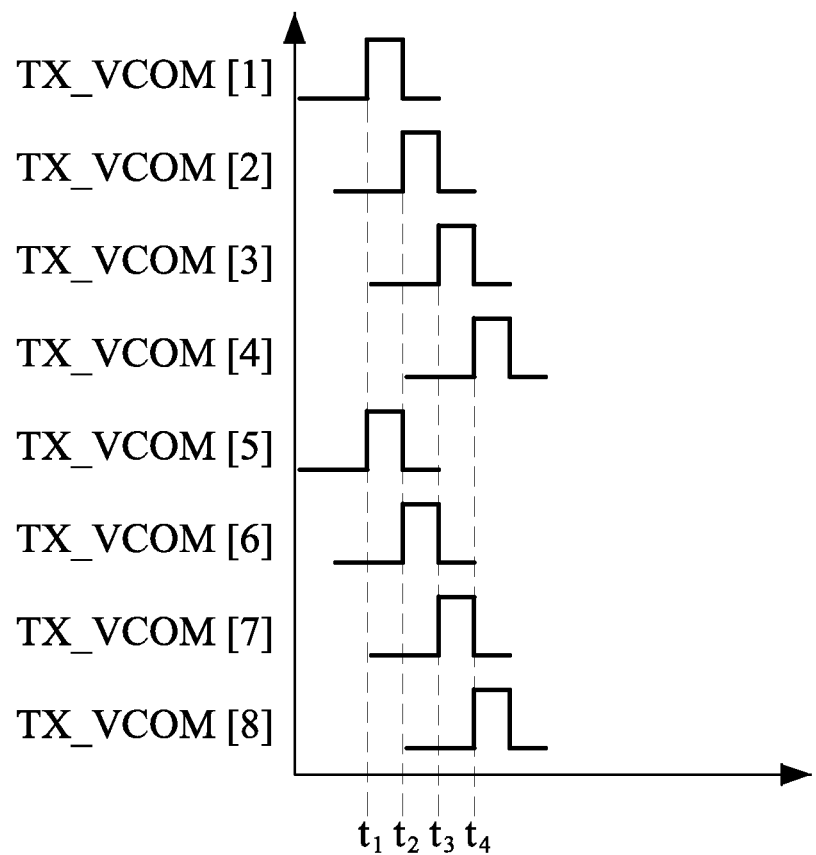
FIG. 3 shows a timing diagram illustrated of scanning TX electrode lines of FIG. 1 according to one embodiment of the present invention.

In touch sensing mode, the driver 12 concurrently scans the groups of TX electrode lines 111. As exemplified in FIG. 3, at time t0, the driver 12 simultaneously scans (i.e., transmits a TX signal to) the first TX electrode line (i.e., TX_VCOM[1]) of the first group and the first TX electrode line (i.e., TX_VCOM[5]) of the second group. In the embodiment, the plural groups are concurrently scanned by a same TX signal. Likewise, the other TX electrode lines 111 (i.e., TX_VCOM[2,3,4] and TX_VCOM[6,7,8]) are scanned in turn in the same manner. It is observed that only four scan periods are required to complete the scan according to the embodiment shown in FIG. 3, compared with the required eight scan periods shown in FIG. 2. Therefore, scan time in touch scan mode is cut in half according to the embodiment.

Figure 4:
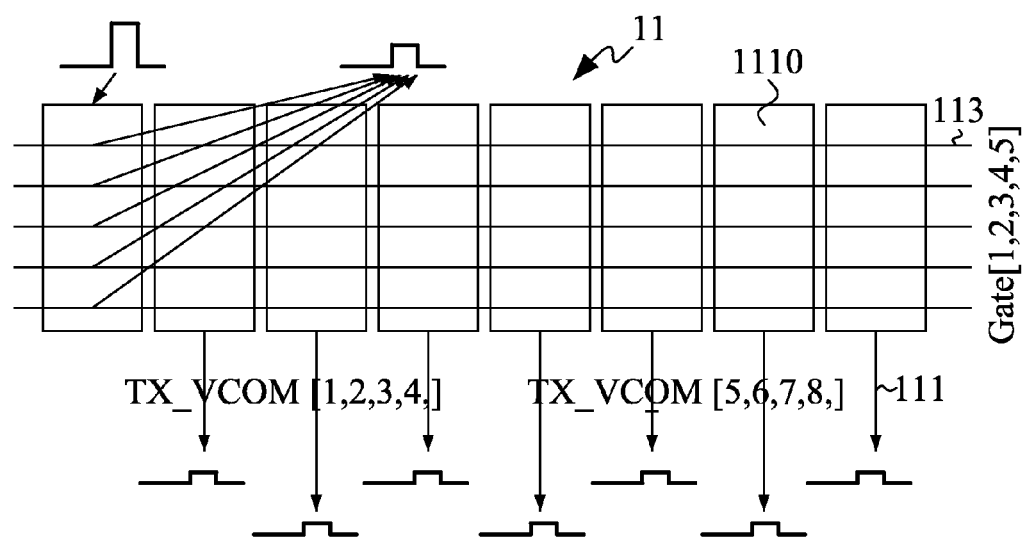
FIG. 4 schematically shows a top view of a VCOM layer of FIG. 1.

FIG. 4 schematically shows a top view of the VCOM layer 11 depicting only the TX electrodes 1110. Gate lines 113 (e.g., Gate[1,2,3,4]) of the in-cell touch screen 100 perpendicularly overlie the TX electrode lines 111. As exemplified in FIG. 4, when a TX electrode line 111 (e.g., the leftest one) is currently scanned by a TX signal, the TX signal may probably be coupled to other TX electrode lines 111 via the gate lines 113, thereby affecting accuracy of the other TX electrode lines 111.

Figure 5:
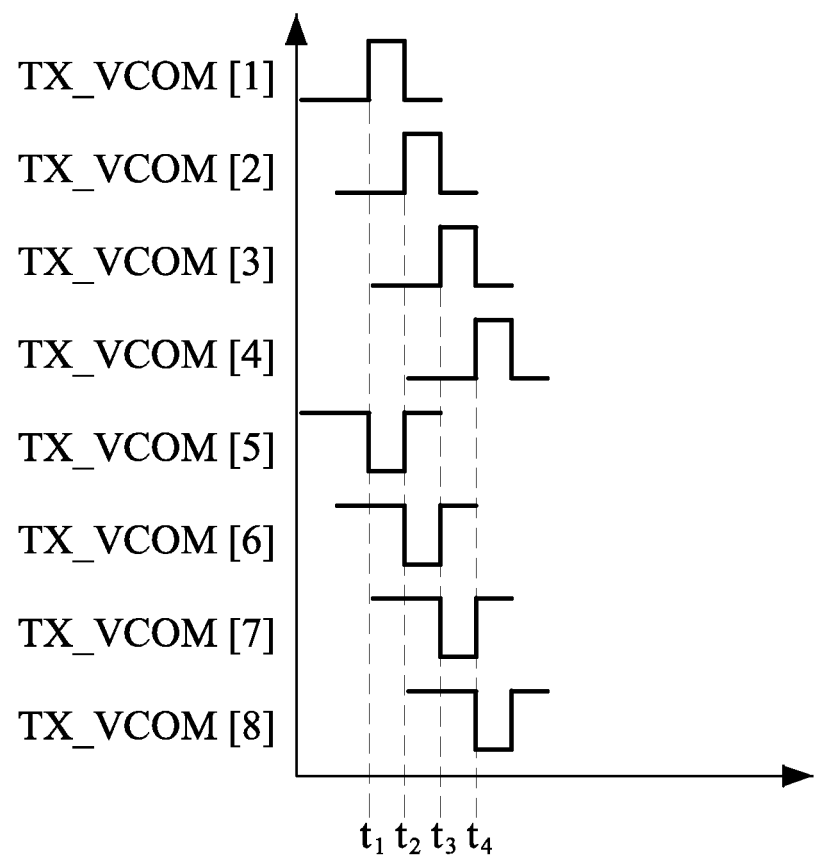
FIG. 5 shows a timing diagram illustrated of scanning TX electrode lines by a driver of FIG. 1 according to another embodiment of the present invention.

FIG. 5 shows a timing diagram illustrated of scanning TX electrode lines TX_VCOM[1] to TX_VCOM[8] by the driver 12 according to another embodiment of the present invention. Similar to the preceding embodiment (FIG. 3), the TX electrode lines 111 are arranged into plural (two in this embodiment) groups. Distinct from the preceding embodiment, the TX electrode lines 111 of different groups are concurrently scanned by different TX signals in the present embodiment. In one embodiment, the TX electrode lines 111 of different groups are concurrently scanned by different TX signals, among which at least one TX signal is an inverse of other TX signal(s). Taking FIG. 5 as an example, the TX electrode lines 111 of the two groups are concurrently scanned by a first TX signal and a second TX signal that is an inverse of the first TX signal.

Figure 6:
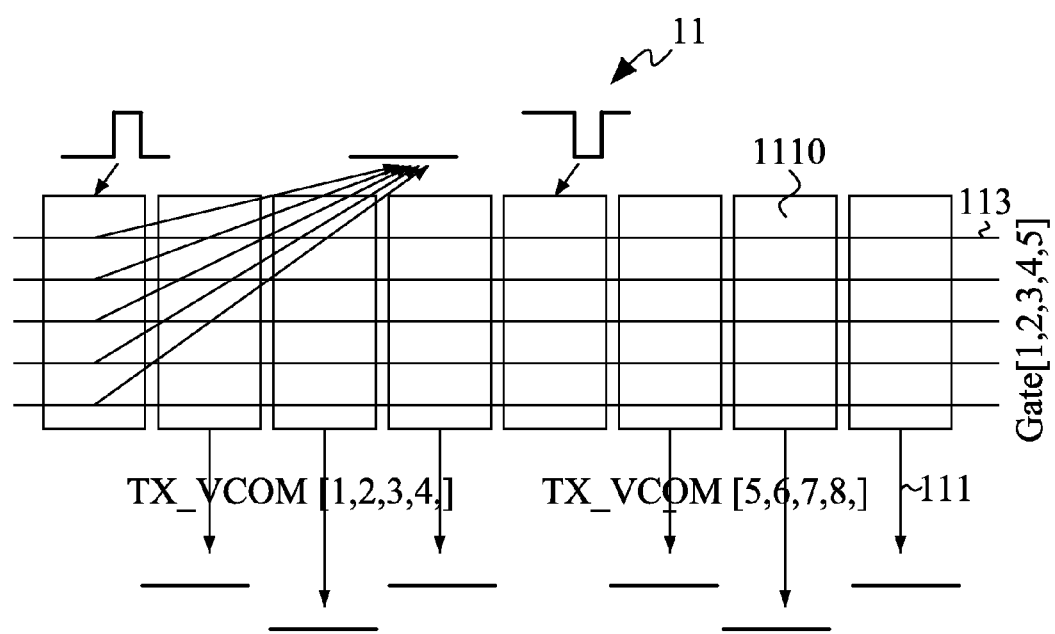
FIG. 6 schematically shows a top view of the VCOM layer associated with FIG. 5.

FIG. 6 schematically shows a top view of the VCOM layer 11 depicting only the TX electrodes 1110 associated with FIG. 5. Gate lines 113 (e.g., Gate[1,2,3,4]) of the in-cell touch screen 100 perpendicularly overlie the TX electrode lines 111. As the TX electrode lines 111 of the two groups are concurrently scanned by DC-balanced TX signals that are inverse to each other, the TX signals may no longer be coupled to other TX electrode lines 111 via the gate liens 113. Therefore, touch accuracy may be substantially enhanced.

Although specific embodiments have been illustrated and described, it will be appreciated by those skilled in the art that various modifications may be made without departing from the scope of the present invention, which is intended to be limited solely by the appended claims.

What is claimed is:

1. A method of driving an in-cell touch screen, comprising:
    providing a touch screen with a common voltage (VCOM) layer divided into transmit (TX) electrodes and receive (RX) electrodes, the TX electrodes forming TX electrode lines in a first direction and the RX electrodes forming RX electrode lines in a second direction;
    arranging the TX electrode lines into a first group and a second group, wherein the first group comprises a first TX electrode line and a second TX electrode line, and the second group comprises a third TX electrode line and a fourth TX electrode line; and
    concurrently scanning the first electrode line with the third electrode line in a touch sensing mode, wherein the first electrode line is scanned with a first TX signal and the third electrode line is scanned with a second TX signal, and the second TX signal is an inverse of the first TX signal;
    concurrently scanning the second electrode line with the fourth electrode line in the touch sensing mode, wherein the second electrode line is scanned with the first TX signal and the fourth electrode line is scanned with the second TX signal,
    wherein the first electrode line and the second electrode line are sequentially scanned by the first TX signal, and the third electrode line and the fourth electrode line are sequentially scanned by the second TX signal.

2. The method of claim 1, wherein the first direction is substantially perpendicular to the second direction.

3. The method of claim 1, wherein the TX electrode lines are scanned in the touch sensing mode, and the TX electrodes and the RX electrodes are electrically connected to a common voltage in a display mode.

4. The method of claim 1, further comprising:
    arranging the RX electrode lines into a plurality of groups.

5. The method of claim 4, wherein a number of electrode lines in the first group is the same as a number of electrode lines in the second group.

6. An in-cell touch screen, comprising:
    a common voltage (VCOM) layer divided into transmit (TX) electrodes and receive (RX) electrodes, the TX electrodes forming TX electrode lines in a first direction and the RX electrodes forming RX electrode lines in a second direction; and
    a driver electrically coupled with the TX electrode lines and the RX electrode lines;
    wherein the TX electrode lines are arranged into a first group and a second group, the first group comprises a first TX electrode line and a second TX electrode line, and the second group comprises a third TX electrode line and a fourth TX electrode line,
    wherein the first electrode line is concurrently scanned with the third electrode line in a touch sensing mode, the first electrode line is scanned with a first TX signal and the third electrode line is scanned with a second TX signal, and the second TX signal is an inverse of the first TX signal;
    wherein the second electrode line is concurrently scanned with the fourth electrode line in the touch sensing mode, the second electrode line is scanned with the first TX signal, and the fourth electrode line is scanned with the second TX signal; and
    wherein the driver sequentially scans the first electrode line and the second electrode line with the first TX signal, and the driver sequentially scans the third electrode line and the fourth electrode line with the second TX signal.

7. The in-cell touch screen of claim 6, wherein the first direction is substantially perpendicular to the second direction.

8. The in-cell touch screen of claim 6, wherein the TX electrodes and the RX electrodes are electrically connected to a common voltage in a display mode.

9. The in-cell touch screen of claim 6, wherein the RX electrode lines are arranged into a plurality of groups.

10. The in-cell touch screen of claim 9, wherein a number of TX electrode lines in the first group is the same as a number of RX electrode lines in the second group.

* * * * *